Dec. 2, 1969  L. A. RHOADES ET AL  3,482,034
CONDUCTIVE TOW CABLE

Filed March 7, 1967  3 Sheets-Sheet 1

INVENTORS
LEE A. RHOADES
MANLEY T. MALLARD
BY Fisher, Christen,
ATTORNEYS

INVENTORS
LEE A. RHOADES
MANLEY T. MALLARD
BY Fisher, Christen, Sabol & Caldwell
ATTORNEYS 3,482,034
CONDUCTIVE TOW CABLE
Lee A. Rhoades and Manley T. Mallard, Culpeper, Va., assignors to Rochester Ropes, Inc., Culpeper, Va., a corporation of Virginia
Filed Mar. 7, 1967, Ser. No. 621,337
Int. Cl. H01b 7/18
U.S. Cl. 174—102                    7 Claims

ABSTRACT OF THE DISCLOSURE

A fishing trawl net includes electrical shocking cables and other electrical instrumentation. The net is towed by a high tensile strength cable which includes an electrically conductive core.

---

This invention relates to metal cables, and more particularly to preformed wire rope having high tensile strength while at the same time carrying one or more wires having high electrical conductivity.

One object of the invention is to provide a high strength, flexible, wire cable, wherein an electrical conductor or conductors are included in one or more of the strands.

Another object of the invention is to provide a seven strand high strength wire cable wherein the core includes an electrical conductor.

Another object of the invention is to provide a wire cable having a plurality of strands in which at least two of the strands are bare and insulated from each other for an extended length for the purpose of establishing electrical potentials underwater having varying polarities.

Still another object of the invention is to provide a shock cable for underwater use such as in fishing.

Other objects and advantages will be apparent to those skilled in the art after reading the following specification in connection with the attached drawings, in which.

Figure 1:
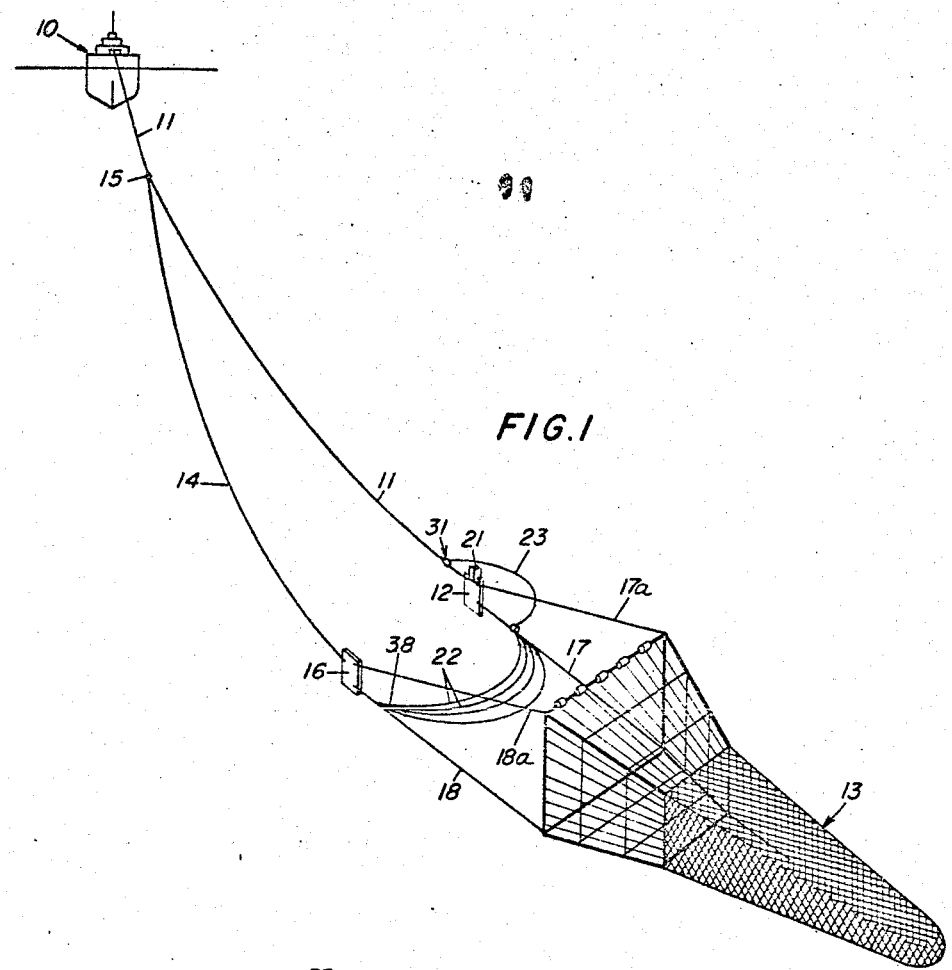
FIGURE 1 is an isometric view of an underwater fishing trawl net in which several forms of the present invention may be embodied.

In FIGURE 1 there is shown a vessel such as a tug or trawler, indicated generally by numeral 10 to which there is streamed a long towing wire or cable 11 extending out as far as one of the doors 12 of a trawl net indicated generally by numeral 13. The cable 11 may be of the type which includes an electrical conductor in the core as will be later described. A second cable 14 has one end spliced to the cable 11 as indicated at 15 with its other end joined to the other door 16 of the net. Two other cables 17 and 18 are streamed out behind the doors and are fastened to the opposite corners of the lower portion of the opening of the net. The towing arrangement is completed by cables 17a and 18a connected between the doors and upper sides of the opening of the net 13.

The towing cable containing the electrical conductor or conductors is fastened to the door of the net by means of a short bridle with thimble or similar end terminal. The splice is made with sleeve connections as is done in making the towing bridle connection. The conductor or conductors are connected to a pulse generator (not shown) mounted on the door of the net.

The core 19 of the cable 11, which may include one or more separate electrical conductors emerges from the end of the cable through a breakout, indicated generally by numeral 20, which may also include an eye splice for the load bearing elements of the cable, so that the electrical conductor, or conductors, may be connected, as by means of a conventional waterproof plug, to a junction box 21 on the door 12.

Extending between the doors 12 and 16 and in front of and along the bottom of the net are "shocking" cables indicated generally by numeral 22 which will be explained later in connection with FIGURE 3. These shocking cables may be energized through connection with the junction box 21 and other conductors, such as the cable 23, may lead to other electrical devices or instruments associated with the net. The main load bearing strands of the cable 11 are formed into an eye (as will be later explained), which can be secured to the door 12 by means of a clevis pin (not shown).

The towing cable 11 comprises a core 19 around which are laid one or more preformed metal strands 24 as in conventional wire rope making practice. In the present instance the core is surrounded by six strands to form what is called a seven strand rope and each of the outer strands 24 may, if desired, be formed of a plurality of helically wound smaller wires in accordance with conventional rope making practice. Further, while the core 19 is shown as having only two electrically conductive wires 25, there may be only one or there may be more than two. Preferably these wires will be individually insulated and encased in a covering of extruded plastic 26 or other material and surrounded with an armoring of helically wound metal wires 27. Several other forms of core will be described later, the only requirement for the core being that it have an outer diameter equivalent to the diameter of the core which it replaces.

In preparation of the splice, indicated at numeral 30 in FIGURE 1, the strands of the bridle cable are laid into the valleys formed by the strands of the conductor cable, ferrules are then slid into place over the "doubled" body and compressed by a suitable tool or machine.

At the net door, a similar splice 31 is made with a short piece of bridle cable equipped with a thimble or similar end terminal for fastening to a clevis on the door. The conductor cable thus is undisturbed and leads to the electrical junction on the door. A breakout of any suitable type of construction is used at these splices to bring the electrically conductive wiring out for connection to the junction box.

Figure 2:
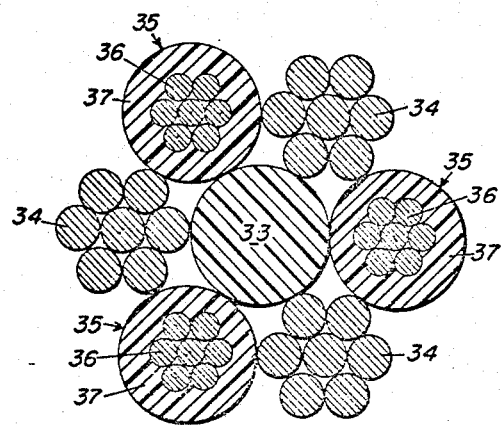
FIGURE 2 is a cross-section of a shock rope incorporated in the trawl net shown in FIGURE 1.

FIGURE 2 illustrates in detail the cross-sectional construction of the shock cable 22. In the form shown the cable is a seven strand preformed type of cable although it should be understood that the number of strands could be varied so long as the central core strand 33 is composed of an insulating material, preferably a plastic such as polypropylene.

Surrounding this core are three conductive strands 34, which in turn could consist of a series of wire filaments of copper, aluminum or the like, each pair of these conductive strands being separated by a non-conductive strand 35 which comprise steel filaments 36 coated with a nylon coating 37. It will be obvious that each of the conductive cables 34 may be connected with separate sources of electrical energy so as to produce electrical potentials between any two of the conductive cables, as by varying the potentials and polarities of the currents supplied by means well known in the art, so as to produce electrical discharges in the water surrounding the cable. Obviously, these charges may be supplied intermittently or continuously and various commutating means could be arranged to reverse polarities in the individual conductive cables. While the entire length of the shocking cable will be fabricated in accordance with the arrangement shown in FIGURE 2, it is obvious that it may be desirable to utilize the shock effect over only a portion of its length and in that case, portions of the cable, particularly the ends of the cable as they approach the doors 16 could be entirely covered with plastic coating as indicated at 38 in FIGURE 1.

Figure 3:
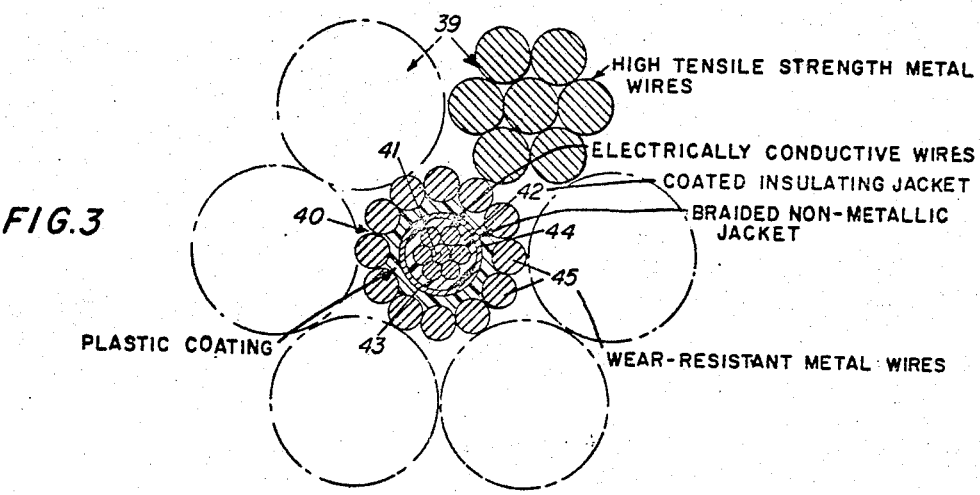
FIGURES 3 and 4 are cross-sections of two forms of combined electrically conducting and load bearing ropes such as may be used for towing the net shown in FIGURE 1, and FIGURES 5, 6, 7, 8 and 9 disclose additional modified forms of combined electrically conductive and load bearing cable.
Figure 4:
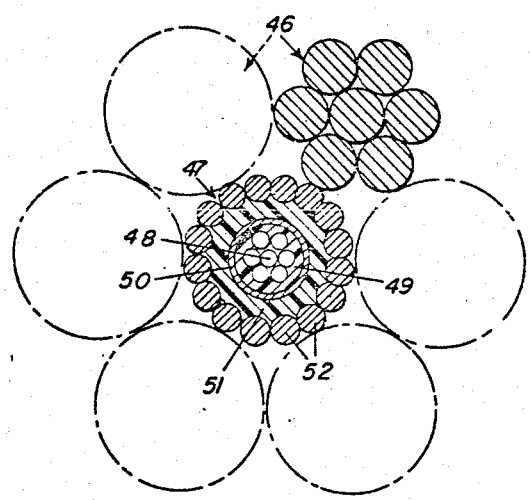

Both FIGURES 3 and 4 show cross-sectional arrangements of single conductor towing cables suitable for use as the towing rope 11, shown in FIGURE 1, and in this connection it should be noted that the use of the term "single conductor" is intended to indicate only that a single strand of the rope is utilized for the transmission of electrical energy although there may be more than one electrical wire contained within that single strand. In the form shown in FIGURE 3, the cable is a seven strand cable having six outer strands, indicated generally by numerals 39, each of which may comprise seven steel or other high tensile strength metal wires, these six strands being helically wound about a core, indicated generally by numeral 40.

The core is composed of one or more copper, aluminum or other electrically conductive wires 41 which may, or may not, be electrically insulated from each other; in the drawing they are bare wires forming a single conductor. This inner group of conductors may be surrounded with an insulating jacket of polyethylene or polypropylene or other similar material 42 and, in addition, this coating may be surrounded with a jacket of braided rayon 43 which, in turn, may be covered with a coating of nylon 44 with a final armor covering composed of twelve steel or other wear-resistant metal wires 45. In this connection, it should be noted that the lay of the armor wires 45 should be opposite to the lay of the outer strands 39; for example, if the outer strands are preformed with a right-hand lay, the inner wires should be preformed with a left-hand lay. Such an arrangement distributes radial pressures incident to winding in multiple layers on small drums and small diameter sheaves.

The form of single conductor cable shown in FIGURE 4 differs somewhat from that of FIGURE 3 although it still basically comprises a seven strand cable having six outer strands, indicated generally by numerals 46, of high tensile steel or other similar material surrounding a core, indicated generally by numeral 47, which in turn is composed of one or more central electrically conductive filaments 48. In this case the conductors may also be surrounded with a polypropylene or polyethylene coating 49 covered in turn by a rayon braided jacket 50 which itself is coated with a nylon plastic 51. In this case the armor comprises fifteen wires 52 and, as in the case of the previous form of cable, if the outer strands 46 are preformed with a right-hand lay the armor wires 52 should be preformed with a left-hand lay.

Figure 5:
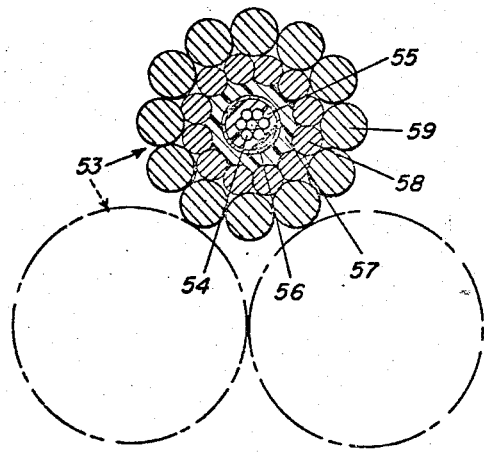

In certain situations where it is desirable to provide more than one separate electrical path of relatively high capacity in a towing cable having, in addition, high tensile strength, a form of cable such as is shown in FIGURE 5 may be preferable. In this modified form the cable consists of three helically wound strands indicated generally by numeral 53. Each of the strands may include a core having a central arrangement of electrical conductors 54 surrounded by polyethylene or polypropylene insulating coating 55 provided with a braided rayon jacket 56 which, in turn, is coated with nylon plastic or other suitable material 57. This inner core of electrical wires and insulating coating is covered with two layers of high tensile strength wires which serve both as load carrying elements and as a protective armoring for the core portion.

As an illustrative example of a three strand cable, the two layers may comprise 12 wires each of Seale type construction. The wires in both layers are preformed and wound in the same direction and opposite to the direction of lay of the strands around a central axis. The lay of the strands may be right-hand or left-hand.

The form of combined conductive and load bearing cable shown in FIGURE 5 provides many advantages in situations where the number of individual conductive wires in a cable would result in an excessive diameter. In many cases if the equivalent number of conductors were placed in the central core of a cable of the type shown in FIGURES 3 and 4, the resulting ope diameter would be too large to operate satisfactorily on existing trawling equipment. The inner layer of wires 58 provides a smooth inner layer to distribute unit pressures on the jacket of the conductor and the larger outer wires 59 resist crushing and abrasion when the cable is wound on small cable drums or passed through small diameter sheaves.

Figure 6:
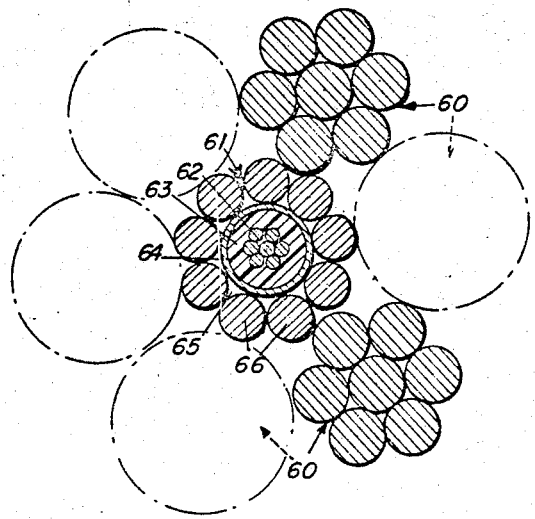

FIGURE 6 discloses another modified form of seven strand cable having an electrically conductive core similar to the cable shown in FIGURES 3 and 4 and in this form the six outer strands of high tensile steel are indicated by numeral 60, surrounding a core, indicated generally by numeral 61, which may include one or more central electrically conductive filaments 62 surrounded by an insulating coating 63 of polypropylene or polyethylene preferably covered by a braided rayon jacket 64 which may, in turn, be coated with nylon plastic 65. In this modification the core is completed by surrounding it with nine preformed helically wound armor wires 66 and, as in the case of the previous modification, these should be of the opposite lay to the lay of the outer strands 60 which are themselves preferably preformed. The advantage of this modified form over those shown in FIGURES 3 and 4 is that with a lesser number of armored wires their diameters may be increased thus increasing the amount of resistance to crushing.

Figure 7:
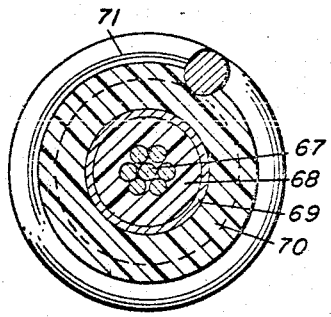
Figure 8:
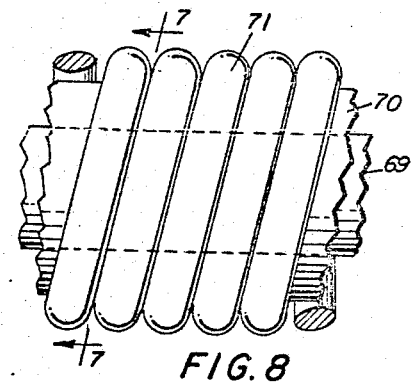

In FIGURES 7 and 8 another type of core member is shown which it has been found is especially resistant to crushing stress. In the drawings, only the core member has been shown and it will be understood that this core member may be substituted for the core members shown in FIGURES 3, 4 and 6 to make up a seven strand wire rope whose outer strands are preformed from high tensile steel as in the previous modification shown. In this type of core the electrically conductive wire 67 may be surrounded with a coating of insulating plastic material 68 having a braided synthetic fabric covering 69 surrounded by another synthetic plastic insulating material 70, around which may be wrapped a single helically wound armor wire 71 which is closely spaced as seen in FIGURE 8. While in the figure the armor wire 71 is indicated as having a circular cross section, it will be understood that it might be formed with an elliptical or even a rectangular cross secion. Due to the fact that each complete turn of the armor wire 71 lies almost in a transverse plane, it offers the greatest amount of resistance to radially inwardly directed forces directed against the outer strands. Also, this nearly transverse arrangement of the turns means that the lay of the outer strands be opposite to that of the lay of the single armor wire surrounding the core because the resultant of the interacting forces between the armor wire and the wires of the outer strands do not exert any appreciable tendency to unravel the armor wire regardless of the direction of their respective lays.

Figure 9:
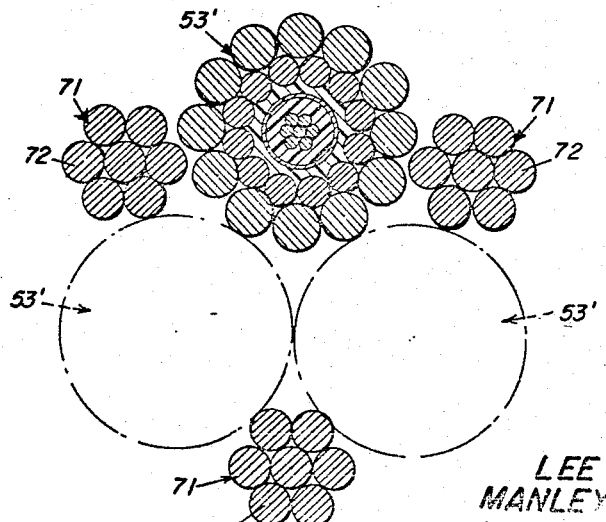

FIGURE 9 discloses a modified form of the electrically conductive cable of FIGURE 5 so as to provide a multiconductor high strength cable which provides a greater amount of tractive contact between the cable and a pulley and is better formed to being wound in multiple layers on a winch drum. In this embodiment each of the preformed strands 53' are identical in construction with the strands 53 as shown in FIGURE 5. But, in addition to the strands 53', there are also provided three filler strands 71, each of which is made up of a seven strand rope of galvanized steel wires 72.

The addition of the filler strands results in the formation of a rope which is more nearly circular in over-all cross-section so that there is less unevenness in the disposition of the rope as it is wound up in multiple layers on a drum and the stresses in the rope are more evenly distributed during bending in passing through a sheave. It also forms a smoother outer strand contour, distributes radial crushing pressures to a greater degree, and provides six valleys instead of the three to facilitate splicing of a six strand bridle cable by means of a ferrule splice.

Having disclosed several forms in which the invention may be practiced, it will be evident to those skilled in the art that various modifications and improvements may be made which would come within the scope of the annexed claims.

We claim:

1. A wire towing rope having an electrically conductive core, comprising a seven strand cable, the six strands surrounding the core strand being preformed of high-tensile strength metal wire filaments, the core strand including at least one filament of electrically conductive metal having low tensile strength, a non-conductive covering surrounding said one filament, and a plurality of helically wound crushing resistant metal armor wires surrounding said non-conductive covering to provide an armor covering, the lay of said last-mentioned wires being opposite to that of the first-mentioned six strands.

2. The invention as defined in claim 1, wherein the core strand includes a plurality of electrically conductive wires.

3. The invention as defined in claim 1, wherein the core strand includes respectively, a first non-conductive coating surrounding the conductive wire, a braided fabric cover surrounding the first non-conductive coating, a second non-conductive coating surrounding the braided cover, and said armor covering the second non-conductive coating.

4. The invention as defined in claim 3, wherein said core strand includes a plurality of conductive wires within the first non-conductive coating.

5. The invention as defined in claim 4, wherein there are twelve crushing-resistant filaments.

6. The invention as defined in claim 4, wherein there are fifteen crushing-resistant filaments.

7. The invention as defined in claim 4, wherein there are nine crushing-resistant filaments.

References Cited
UNITED STATES PATENTS 1,904,116  4/1933  Baum _____ 174—128

E. A. GOLDBERG, Primary Examiner

U.S. Cl. X.R.

174—121, 128, 235